United States Patent
De La Roij

(10) Patent No.: US 8,647,431 B2
(45) Date of Patent: Feb. 11, 2014

(54) CATALYST COMPOSITION WHICH IS INTENDED FOR USE WITH POZZOLAN COMPOSITIONS

(75) Inventor: Robin De La Roij, Zwijndrecht (NL)

(73) Assignee: MEGA-TECH Holding B.V., Moerdijk (NL)

( * ) Notice: Subject to any disclaimer, the term of this patent is extended or adjusted under 35 U.S.C. 154(b) by 0 days.

(21) Appl. No.: 13/585,902

(22) Filed: Aug. 15, 2012

(65) Prior Publication Data

US 2014/0000490 A1     Jan. 2, 2014

(30) Foreign Application Priority Data

Jun. 29, 2012 (NL) ...................................... 2009093

(51) Int. Cl.
| | |
|---|---|
| C04B 22/12 | (2006.01) |
| C04B 22/06 | (2006.01) |
| B01J 21/10 | (2006.01) |
| B01J 23/02 | (2006.01) |
| B01J 23/745 | (2006.01) |
| B01J 27/10 | (2006.01) |
| B01J 27/128 | (2006.01) |
| B01J 27/138 | (2006.01) |

(52) U.S. Cl.
USPC ........... 106/815; 106/819; 502/224; 502/226; 502/229; 502/231; 502/300; 502/325; 502/328

(58) Field of Classification Search
USPC ......... 502/224, 226, 231, 300, 325, 328, 229; 106/815, 819
See application file for complete search history.

(56) References Cited

U.S. PATENT DOCUMENTS

| | | |
|---|---|---|
| 7,316,744 B2 | 1/2008 | De La Roij |
| 7,993,449 B2 | 8/2011 | De La Roij |
| 2007/0010641 A1 * | 1/2007 | Adur et al. ................. 526/237 |

FOREIGN PATENT DOCUMENTS

| | | |
|---|---|---|
| EP | 1 349 819 | 9/2004 |
| EP | 1 829 840 | 9/2007 |
| WO | WO 2005087687 A1 * | 9/2005 |

\* cited by examiner

*Primary Examiner* — Anthony J Green
(74) *Attorney, Agent, or Firm* — Young & Thompson

(57) ABSTRACT

A catalyst composition for pozzolan compositions, includes: a) one or more chlorides, selected from the group consisting of: sodium chloride, potassium chloride, magnesium chloride, calcium chloride, strontium chloride, barium chloride and/or ammonium chloride, preferably ammonium chloride; b) aluminum chloride, and c) one or more metal oxides, preferably selected from the group consisting of: oxides from metals from Group II of the Periodic Table, oxides from metals from Group VIII B of the Periodic Table (e.g. iron oxide), more preferably oxides from metals from Group II of the Periodic Table, even more preferably magnesium oxide or calcium oxide, most preferably magnesium oxide. The use of the catalytic composition for addition to cement for oil well cementing, and for lowering the pH of cement, a method for obtaining a composition for reinforcing cement, a binder composition and a construction composition are also described.

6 Claims, No Drawings

CATALYST COMPOSITION WHICH IS INTENDED FOR USE WITH POZZOLAN COMPOSITIONS

BACKGROUND

The present invention relates to a catalyst composition which is intended for use with pozzolan compositions and to applications for compositions of this type.

Patent EP 1 349 819 of the present inventor discloses a composition for reinforcing cement, which contains: a) sodium chloride, potassium chloride, magnesium chloride, calcium chloride, strontium chloride, barium chloride and/or ammonium chloride; b) aluminum chloride; and c) silica and/or zeolite and/or apatite.

This composition for reinforcing cement according to EP 1 349 819 is commercially available from PowerCem Technologies B.V. under the registered trade names of PowerCem and RoadCem.

In a preferred embodiment of the composition of EP 1 349 819, this composition comprises a combination of sodium chloride, potassium chloride, ammonium chloride, magnesium chloride, calcium chloride, aluminum chloride, silica, magnesium oxide, magnesium hydrogen phosphate, magnesium sulphate, sodium carbonate, and cement.

The composition for reinforcing cement according to EP 1 349 819 shows excellent performances in the field. For example, in road construction or soil consolidation.

However, the present inventor (also inventor of EP 1 349 819) has recently discovered that for certain applications it is desirable to provide a composition having an increased reactivity.

It is an aim of the present invention to provide a composition for reinforcing cement having a higher reactivity.

SUMMARY OF THE INVENTION

This aim is obtained by the catalyst composition for pozzolan compositions, comprising:
  a) one or more chlorides, selected from the group consisting of: sodium chloride, potassium chloride, magnesium chloride, calcium chloride, strontium chloride, barium chloride and/or ammonium chloride, preferably ammonium chloride;
  b) aluminum chloride, and
  c) one or more metal oxides, preferably selected from the group consisting of: oxides from metals from Group II of the Periodic Table, oxides from metals from Group VIII B of the Periodic Table (e.g. iron oxide), more preferably oxides from metals from Group II of the Periodic Table, even more preferably magnesium oxide or calcium oxide, most preferably magnesium oxide.

In an embodiment of the present invention, the total quantity of components from group a. is 1 to 25% by weight, preferably 5 to 15% by weight, more preferably 8 to 13% by weight; based on the total weight a.+b.+c.

In an embodiment of the present invention, the total quantity of components from group b. is 10 to 50% by weight, preferably 20 to 40% by weight, more preferably 25 to 35% by weight, based on the total weight a.+b.+c.

In an embodiment of the present invention, the total quantity of components from group c. is 5 to 40% by weight, preferably 10 to 30% by weight, more preferably 15 to 25% by weight, based on the total weight a.+b.+c.

Moreover, the present invention relates to the use of a catalytic composition according to the present invention for addition to cement for oil well cementing.

Moreover, the present invention relates to the use of a catalytic composition according to the present invention for lowering the pH of cement.

Moreover, the present invention relates to a method for obtaining a composition for reinforcing cement, comprising a combination of sodium chloride, potassium chloride, ammonium chloride, magnesium chloride, calcium chloride, aluminum chloride, silica, magnesium oxide, magnesium hydrogen phosphate, magnesium sulphate, sodium carbonate, and cement by firstly combining ammonium chloride, aluminum chloride, and magnesium oxide to form the catalytic composition and consequently adding the remaining additives.

The present invention also relates to a binder composition comprising:
  i) an ash in an amount of 30.0-70.0 wt. %, based on the total weight of the binder composition;
  ii) a catalyst composition, comprising:
    a) one or more chlorides, selected from the group consisting of: sodium chloride, potassium chloride, magnesium chloride, calcium chloride, strontium chloride, barium chloride and/or ammonium chloride, preferably ammonium chloride; and
    b) aluminum chloride, and
    c) one or more metal oxides, preferably selected from the group consisting of: oxides from metals from Group II of the Periodic Table, oxides from metals from Group VIII B of the Periodic Table (e.g. iron oxide), more preferably oxides from metals from Group II of the Periodic Table, even more preferably magnesium oxide or calcium oxide, most preferably magnesium oxide;
  iii) a cement in an amount of 25.0-69.9 wt. %, based on the total weight of the binder composition.

The present invention also relates to a construction composition comprising:
  i) an ash in an amount of 90.0-99.9 wt. %, based on the total weight of the construction composition, wherein the ash is fly ash or bottom ash;
  ii) a catalyst composition, comprising:
    a) one or more chlorides, selected from the group consisting of: sodium chloride, potassium chloride, magnesium chloride, calcium chloride, strontium chloride, barium chloride and/or ammonium chloride, preferably ammonium chloride; and
    b) aluminum chloride, and
    c) one or more metal oxides, preferably selected from the group consisting of: oxides from metals from Group II of the Periodic Table, oxides from metals from Group VIII B of the Periodic Table (e.g. iron oxide), more preferably oxides from metals from Group II of the Periodic Table, even more preferably magnesium oxide or calcium oxide, most preferably magnesium oxide; and
  iii) cement, in an amount of 0.0-5.0 wt. %, based on the total weight of the construction composition.

DETAILED DESCRIPTION OF THE INVENTION

Extensive studies by the present inventor have revealed that with the use of the composition of EP 1 349 819 (viz. comprising sodium chloride, potassium chloride, ammonium chloride, magnesium chloride, calcium chloride, aluminum chloride, silica, magnesium oxide, magnesium hydrogen phosphate, magnesium sulphate, sodium carbonate, and cement) the combination of components a), b) and c) of the present catalytic composition are responsible for the activation of the remaining components. This catalytic composition imposes reactivity of the other components to a full oxidation reaction when water is added to the dry mixture.

Based on this remarkable and surprising finding, the inventor has arrived at the present invention.

An additional advantage of the present catalytic composition as revealed by research carried out by the present inventors is that it is possible to use a better grade (higher purity) aluminum chloride, such as 99% (2N), 99.9% (3N), 99.99% (4N) or even 99.999% (5N) Aluminum chloride, in the preparation of e.g. the RoadCem or PowerCem product of EP 1 349 81.

Without wishing to be bound by a theory, the inventor believes that this is caused by the following. Several of the components of the RoadCem or PowerCem product of EP 1 349 81 comprise water of crystallization in their crystal structures. This water of crystallization reacts with some of the reactive components and deactivates e.g. the aluminum chloride in a preliminary oxidation reaction. The release of this water of crystallization is increased during the process of mixing the components together in which mixing process optionally crushers are used which generate heat.

Even when a high grade aluminum chloride is used in the preparation of the RoadCem or Powercem products, this grade is lowered upon storage. Higher grade aluminum chloride is more expensive than lower grade aluminum chloride and when the higher quality does not provide an additional reactivity since it has deactivated, it is not of any commercial use to start with a high grade aluminum chloride. With the catalyst of the present invention, this deactivation does not occur since the catalyst composition in only mixed with the remaining (water of crystallization containing) components shortly before it is used. In that case, there is not sufficient time for the deactivation to occur and the higher reactivity of aluminum chloride is maintained. The technical effect, is to supply a highly reactive catalyst composition.

In this case the catalyst composition is prepared and stored separately from the remaining components. Shortly before using RoadCem or PowerCem product of EP 1 349 81 the catalyst composition is mixed with the remaining components.

Moreover, the catalyst composition can be added to cement to increase the reactivity of cement and provide a high energetic value of the cement. Thus the present invention relates to the use of the catalyst composition to reinforce cement for high-demanding applications, for example cementing of wellbores (explained later on).

The term cement is understood to refer to a salt hydrate consisting of a fine-ground material which, after mixing with water, forms a more or less plastic mass, which hardens both under water and in the outside air and which is capable of bonding materials suitable for that purpose to form a mass that is stable also in water. The cement standards according to European standard NEN-EN-197-1 are as follows: CEM I is Portland cement; CEM II is composite Portland cement; CEM III is blast furnace slag cement; CEM IV is pozzolan cement and CEM V is composite cement.

The catalyst composition can be added to pozzolan materials. The effect of the catalyst composition is that it activates the pozzolan characteristics of e.g. fly ash or bottom as (preferably E-fly ash or E-bottom ash) to hydrolyze these ashes.

A pozzolan is a material which, when combined with calcium hydroxide, exhibits cementitious properties. Pozzolans are a siliceous or aluminosiliceous material, which is highly vitreous. Pozzolans are commonly used as an addition or "supplementary cementitious material" or SCM to Portland cement concrete mixtures to increase the long-term strength and other material properties of Portland cement concrete, and in some cases reduce the material cost of concrete. Pozzolans are primarily vitreous siliceous materials which react with calcium hydroxide to form calcium silicates; other cementitious materials may also be formed depending on the constituents of the pozzolan. The most commonly used pozzolan today is fly ash, though silica fume, high-reactivity metakaolin, ground granulated blast furnace slag, fly ash and other materials are also used as pozzolans. Many pozzolans available for use in construction today were previously seen as waste products, often ending up in landfills. Use of pozzolans can permit a decrease in the use of Portland cement when producing concrete; this is more environmentally friendly than limiting cementitious materials to Portland cement.

E-fly ash (pulverised coal fly ash) is a fine powder which consists mainly of spherical glassy particles having pozzolane properties (i.e. the particles cement with lime and water into stable compounds that do not dissolve in water). E-fly ash is released in pulverised coal-fired power plants, where the fly ash is separated from the flue glass flow by means of electrostatic filters. The properties of E-fly ash are influenced by the origin of the coal, the process conditions in the power plant and the manner of transportation of the ash. E-fly ash may cause environmental problems when released into the atmosphere.

E-bottom ash is released in pulverised coal-fired power plants. E-bottom ash is released as "heavy" ash particles during the combustion process. The material is a burned, dehydrated clay which is coloured brown-black. A distinction may be made into porous (sintered) and dense (molten) E-bottom ash granules. If the E-bottom ash is certified, it is also referred to as "boiler sand".

Bag house dust is a material that has physical properties that are comparable to E-fly ash.

In addition to E-fly ash and E-bottom ash, there is also the so-called WI fly ash and WI bottom ash (WI=Waste Incineration), which both have properties that are completely different from the properties of E-fly ash and E-bottom ash.

WI fly ash consists of a fine dustlike/powdery material that is formed as a residual product in the incineration of domestic waste and comparable industrial waste. The incineration takes place in waste incineration plants and concerns the ash that can be separated from the crude flue gases from such a plant by means of electrostatic filters.

WI bottom ash (previously called "slag") consists for 50% of an amorphous mass and for the rest of other materials, such as glass, rubble/ceramics, slag-like material and small amounts of iron and non-combusted organic material. WI bottom ash is formed during the combustion of domestic waste and comparable industrial waste.

In European patent application EP 1829840 of the present inventors a binder composition is disclosed comprising an ash, an additive composition and a cement. The binder composition of EP 1829840 comprising:

a) an ash in an amount of 30.0 70.0 wt. %, based on the total weight of the binder composition;

b) an additive composition in an amount of 0.1 5.0 wt. %, based on the total weight of the binder composition, wherein the additive composition comprises one or more components from group (b1) and one or more components from group (b2), wherein group (b1) consists of metal chlorides and wherein group (b2) consists of silica, zeolite and apatite, and wherein the one or more components from group (b1) make up 70.0 99.0 wt. % of the total weight of the components (b1) and (b2) and wherein the one or more components from group (b2) make up 1.0 30.0 wt. % of the total weight of the components (b1) and (b2);

c) a cement in an amount of 25.0-69.9 wt. %, based on the total weight of the binder composition.

The present catalytic composition can also be used in this binder composition instead of the additive composition of group b). Thus the present invention also relates to a binder composition comprising:

i) an ash in an amount of 30.0-70.0 wt. %, based on the total weight of the binder composition;
ii) a catalyst composition, comprising:
   a) one or more chlorides, selected from the group consisting of: sodium chloride, potassium chloride, magnesium chloride, calcium chloride, strontium chloride, barium chloride and/or ammonium chloride, preferably ammonium chloride; and
   b) aluminum chloride, and
   c) one or more metal oxides, preferably selected from the group consisting of: oxides from metals from Group II of the Periodic Table, oxides from metals from Group VIII B of the Periodic Table (e.g. iron oxide), more preferably oxides from metals from Group II of the Periodic Table, even more preferably magnesium oxide or calcium oxide, most preferably magnesium oxide;
iii) a cement in an amount of 25.0-69.9 wt. %, based on the total weight of the binder composition.

In addition to that the present application relates to a composition for construction comprising a basic component and the present binder composition, and also to a method for obtaining the same and uses thereof. EP 1829840 is incorporated by reference herein in its entirety.

An advantage of such a binder composition is that the binder composition, when used in a composition for construction, converts hexavalent chromium that is present in the composition into trivalent chromium, and that said chromium compounds, as well as any harmful radon that may be present in the composition, will not find their way into the environment (see the Examples). Such an advantage is achieved to a lesser extent, or even not at all, with a binder composition that comprises amounts of ash, additive composition and cement that do no fall within the scope of present invention.

Preferred embodiments of the binder composition are give below.

In a preferred embodiment, the amount of component a) in the binder composition is 40-65 wt. %, in particular 50-60 wt. %, since this will provide optimum results if the binder is used in a construction composition (also refer to the examples hereinafter).

Preferably the ash of component a) is selected from E-fly ash, E-bottom ash, bag house dust and a combination thereof.

In a preferred binder composition, the amount of component b) is 0.1-2.0 wt. %, preferably 0.5 to 1 wt. % of the total binder composition, as it has been found that good binding properties are obtained in particular in this range, whilst the composition is cost-effective.

In European patent application EP 1829840 (incorporated by reference herein in its entirety) of the present inventor a construction composition and a method for making a construction product is disclosed, comprising:

an ash in an amount of 90.0-99.9 wt. %, based on the total weight of the construction composition, wherein the ash is fly ash or bottom ash;
an additive composition in an amount of 0.1-10.0 wt. %, based on the total weight of the construction composition, wherein the additive composition comprises a component from group (2a) and a component from group (2b), wherein group (2a) consists of metal chlorides and wherein group (2b) consists of silica, zeolite and apatite, and wherein group (2a) comprises 70.0-99.0 wt. % of the total additive composition and group (2b) comprises 1.0-30.0 wt. % of the total additive composition, wherein group (2a) comprises at least one component from group (2a1) and a component from group (2a2), wherein group (2a1) consists of sodium chloride, potassium chloride, magnesium chloride, calcium chloride, strontium chloride, barium chloride, and ammonium chloride, and wherein the group (2a2) consists of aluminum chloride; and
cement, in an amount of 0.0-5.0 wt. %, based on the total weight of the construction composition.

The present catalytic composition can also be used in this construction composition instead of the additive composition of group b). Thus the present invention also relates to a construction composition comprising:

i) an ash in an amount of 90.0-99.9 wt. %, based on the total weight of the construction composition, wherein the ash is fly ash or bottom ash;
ii) a catalyst composition, comprising:
   a) one or more chlorides, selected from the group consisting of: sodium chloride, potassium chloride, magnesium chloride, calcium chloride, strontium chloride, barium chloride and/or ammonium chloride, preferably ammonium chloride; and
   b) aluminum chloride, and
   c) one or more metal oxides, preferably selected from the group consisting of: oxides from metals from Group II of the Periodic Table, oxides from metals from Group VIII B of the Periodic Table (e.g. iron oxide), more preferably oxides from metals from Group II of the Periodic Table, even more preferably magnesium oxide or calcium oxide, most preferably magnesium oxide; and
iii) cement, in an amount of 0.0-5.0 wt. %, based on the total weight of the construction composition.

The ash of this construction composition can be the same as the ash described above for the binding composition.

In a preferred embodiment, the construction composition is added in the method for making a construction product, such that the weight of the construction composition comprises 10-90 wt % (wet weight) of the bottom material, e.g. 10-80 wt. %.

The catalyst composition of the present invention, viz. the catalyst will in the future probably be marketed by PowerCem Technologies B.V. under the trademark of RC-C (RoadCem-catalyst).

In various sectors, cement is used as a binder. Possible applications of cement include the stabilization of soil, when building bored wells, houses, roads and tunnels, the immobilization of pollutants or sludge, the production of concrete, etc. In these applications, additives which increase the binding force of cement are generally added to the cement.

Group a) of the present catalyst composition are alkali metal and alkaline earth metal chlorides. Ammonium chloride is the most preferred of this group since it provides the highest reactivity in combination with aluminum chloride and the metal oxides.

Group b) is composed of aluminum chloride and is important for the formation of crystalline compounds. Aluminum chloride is preferred, but may also be partially replaced by other chlorides of trivalent metals, such as iron (III) chloride.

Group c. is composed of metal oxides. Magnesium oxide is preferred. The effect of these metal oxides is that they take part in the chain reaction that lead to a crystalline matrix. The metal oxides form clusters with other ions that are formed into oxides.

The present invention is preferably a mixture of noble metals (e.g. aluminum) and non-noble metals (e.g. magnesium) which combined give a synergistic reaction to the formation of stable crystalline structures.

For an optimum composition of the catalyst, the total quantity of components from group a. is 1 to 25% by weight, preferably 5 to 15% by weight, more preferably 8 to 13% by weight; most preferably 10 wt. % based on the total weight a.+b.+c.

For an optimum composition of the catalyst, the total quantity of components from group b. is 10 to 50% by weight, preferably 20 to 40% by weight, more preferably 25 to 35% by weight, most preferably 30 wt. % based on the total weight a.+b.+c.

For an optimum composition of the catalyst, the total quantity of components from group c. is 5 to 40% by weight, preferably 10 to 30% by weight, more preferably 15 to 25% by weight, most preferably 20 wt. % based on the total weight a.+b.+c.

Prior to the use as a composition for reinforcing cement, in addition to the components from groups a., b. and c. referred to above, one or more additional components such as for example one or more zeolites and/or one or more sulphates (e.g. magnesium sulphate) and/or additional chlorides and/or one or more carbonates (e.g. sodium carbonate) and/or one or more cements.

The present catalyst is preferably used in an amount of 0.1 to 15 wt. % based on the amount of pozzolan materials, preferably in an amount of 0.5 to 10 wt. %, more preferably in an amount of between 1 and 5 wt. %, such as for example 2 wt. %, 3 wt. %, or 4 wt. %.

Preferred pozzolan materials for use in the present invention are ashes as disclosed above for the binder composition and the construction composition.

Without wishing to be tied to any specific theory, experimental results indicate that the components which are present in the catalyst form crystalline structures when added to cement material which are well bonded together and are homogeneously distributed, in between the cement particles, and thereby bind the cement particles. Hardened cement which is prepared without this binder or with known binders has a relatively open structure when viewed on a microscopic scale, with crystalline agglomerations which are not homogeneously distributed. Consequently, the interaction between the crystalline agglomerations and also between the cement particles and the crystalline agglomerations is poor.

The crystalline compounds which are formed by this additive are surprisingly homogeneously distributed and may be in the form of acicular (viz. needle-like) structures. The homogeneous distribution results in an optimum strength and stability. The water in the cement is bound in and to the crystalline structures. Consequently, there are no local concentrations of water, and therefore the formation of potential weak spots is avoided.

The present catalyst composition has been found be induce the forming of nanoscale crystalline compounds. Hence, the function of the catalyst of the present invention is the formation of durable crystal structures.

This catalyst composition according to the present invention can be prepared by combining the required components and dry-mixing them. The catalyst composition according to the invention is preferably assembled from the above-mentioned components in pure form (>97%, or even >98%, or even >99%)).

Suspensions based on the catalyst composition described above have a pH of between approx. 9 and 9.6 (1 part composition and 20 parts water, T=16.8° C.).

When cement is formed, the pH is highly basic having a pH of between 12 and 13. This is caused by the high concentrations of calcium oxide which forms calcium hydroxide when exposed to water. This is not only detrimental to people working with cement since cement can cause chemical burns; but the presence of hexavalent chromium can cause ulcers.

It has surprisingly been found by the present inventor that the catalyst composition according to the present invention regulates the pH balance of cement by lowering the pH of cement in time, possible to a neutral pH. Moreover, the crystalline structure that is formed as cited above is capable of enclosing or entrapping hexavalent chromium thereby rendering it harmless since it cannot leak from the cement.

Thus the present invention is also related to the use of the present catalyst composition for lowering the pH of cement, optionally to a neutral pH (viz a pH between 6.5 and 7.5).

Without wishing to be bound to a theory, the following is observed. When water is added to cement, each of the compounds undergoes hydration and contributes to the final product. Only the calcium silicates contribute to strength. Tricalcium silicate is responsible for most of the early strength during first 7 days. Dicalcium silicate, which reacts more slowly, contributes only to the strength at later times. Upon the addition of water, tricalcium silicate rapidly reacts to release calcium ions, hydroxide ions, and a large amount of heat. The pH quickly rises over 12 because of the release of alkaline hydroxide (OH—) ions. This initial hydrolysis slows down quickly with a corresponding decrease in heat.

In addition to the uses above, the catalyst composition according to the invention can be used for: i. stabilizing/modifying cement and consolidating sand, sludge and/or soil, such as for the construction and laying of bored wells, roads, dykes, tunnels, foundations and the like; ii. immobilizing pollutants, such as heavy metals, but also fly ash; iii. when injecting cement compositions, such as grouting; When grouting, a mixture or suspension of composition, cement and/or sand in combination with water is injected. 50-100 g of cement and approx. 2 g of composition are added per 100 g of water. In this case, a drum or mixing silo is filled with water, composition according to the invention and cement, and then the metered quantity is injected. The pressure is 10 to 400 bar. iv. the production of concrete.

One of the uses of the catalyst composition of the present invention is as an (nano-engineered) additive for oil well cementing. A composition is used in the form of a very fine grain sized powder that comprises several components including alkali minerals, (synthetic) zeolites and the present catalyst composition. The present catalyst composition improves flexibility and increases compressive strength.

One important use of concrete or cement in the oil and gas field is as so-called "well cementing" or the cementing of the drilling or oil well. For this use deep bores are drilled into the ground or soil. The inside of these bores are covered by a metallic layer or pipe that is used to guide the oil from the oil field up to the surface. These metallic layers should adhere to surrounding environment (i.e. soil or rock). In order to obtain this adhesion between the metallic layer (casing or casing string) and the surroundings cement is often used.

Wellbores are protected and sealed by cementing, i.e. for shutting off water penetration into the well, to seal the annulus after a casing string (viz. a long section of connected oilfield pipe) has been introduced down the wellbore, or to plug a wellbore to abandon it. Cementing is carried out using a cement slurry that is pumped into the well. In this method, usually the drilling fluids that are present inside the will are replaced by cement. The cement slurry fills the space between the casing and the actual wellbore, and hardens to create a seal. This presents external materials entering the well flow and positioning the casing string into place permanently.

The wet cement (viz. cement slurry) is obtained by the use of mixers (e.g. hydraulic jet mixers, re-circulating mixers or batch mixers) from water and dry cement and one or more additives.

For wellbore cementing Portland cement is most frequently used (calibrated with additives to 8 different API classes). Examples of additives are accelerators, which shorten the setting time required for the cement, as well as retarders, which do the opposite and make the cement setting time longer. In order to decrease or increase the density of the cement, lightweight and heavyweight additives are added. Additives can be added to transform the compressive strength of the cement, as well as flow properties and dehydration rates. Extenders can be used to expand the cement in an effort to reduce the cost of cementing, and antifoam additives can be added to prevent foaming within the well. In order to plug lost circulation zones, bridging materials are added, as well.

The present invention provides catalytic composition to be used as an additive for cement to be used for wellbores.

A method for well cementing is known in the art. After casing string has been run into the well, an cementing head is attached to the top of the wellhead to receive the slurry from the pumps. A so-called bottom plug and top plug are present inside the casing and prevent mixing of the drilling fluids from the cement slurry. First, the bottom plug is introduced into the well, and cement slurry is pumped into the well behind it, viz. within the casing and not yet between the casing and its surroundings. Then the pressure on the cement being pumped into the well is increased until a diaphragm is broken within the bottom plug, permitting the cement slurry to flow through it and up the outside of the casing string, viz. outside of the casing and hence between the casing and its surroundings. After the proper volume of cement is pumped into the well, a top plug is pumped into the casing pushing the remaining slurry through the bottom plug. Once the top plug reaches the bottom plug, the pumps are turned off, and the cement is allowed to set.

Since wellbores are very deep, setting or hardening at deep depths and under conditions of high temperature and/or high pressure, and optionally corrosive environments, there are stringent requirements for the cement.

A few of the challenges today with respect to well cementing are discussed below.

Despite recent technological advances with elastomers, polymers, fibres and reactive components that self-heal micro fissures, the cement sheath between the casing string and the surrounding rock/soil is not always able to deliver an acceptable long-term solution for today's demanding drilling environment. Changes in down hole conditions with pressure and temperature fluctuations impose stresses on the cement sheath. Consequently, shrinking and de-bonding of the cement sheath creates very small micro cracks allowing fluid migration. Besides these external forces that cause cement sheath damage an evaluation of conventional oil well cement sheath on the nanoscopic scale from 1-100 nm reveals that the chemical bond between components within the cement itself is relatively brittle.

Examples of the challenges are: i) micro cracks occurring because of fluctuations in pressure and/or temperature inside the well; ii) undesired gas migration due to shrinkage or expansion of the cement; iii) corrosion of the protective casing, which costs hundreds of millions and which reduces longevity.

There are several demands required in the field of well cementing, viz. with respect to density, permeability, shrinkage, bonding, chemical resistance, setting time, viscosity, flexibility, and durability. Moreover, downhole temperature can exceed 200° C.

An example of preferred product criteria for cement for wells are the following:
Density: value<1300 kg/m$^3$
Permeability: material has to be impermeable
Shrinkage: material may not shrink, expansion is preferred
Bonding: good bond required with steel
Chemical resistance: high chemical resistance required
Thickening time: materials needs to be workable up to 6 hours
Viscosity: preferably 300 CP
Flexibility: stretch of 2% without fracturing Known Portland cement consists of five major compounds and a few minor compounds. The composition of a typical Portland cement is as follows: 50 wt. % of tricalcium silicate ($Ca_3SiO_5$ or $3CaO.SiO_2$); 25 wt. % of dicalcium silicate ($Ca_2SiO_4$ or $2CaO.SiO_2$); 10 wt. % of tricalcium aluminate ($Ca_3Al_4O_6$ or $3CaO.Al_2O_3$); 10 wt. % of tetracalcium aluminoferrite ($Ca_4Al_2Fe_2O_{10}$ or $4CaO.Al_2O_3.Fe_2O_3$); 5 wt. % of gypsum ($CaSO_4.2H_2O$)

The strength of cement bound products is very much dependent upon the hydration reaction just discussed. Water plays a critical role, particularly the amount used. The strength of the product increases, when a lower amount of water is used. The hydration reaction itself consumes a specific amount of water. The empty space (porosity) is determined by the water to cement ratio. The water to cement ratio is also called the water to cement factor (abbreviated by wcf) which is the ratio of the weight of water to the weight of cement used in the slurry. The wcf has an important influence on the quality of the cement produced.

Low water to cement ratio leads to high strength but low workability. High water to cement ratio leads to low strength, but good workability. Time is also an important factor in determining product strength. The product hardens as time passes. The hydration reactions get slower and slower as the tricalcium silicate hydrate forms. It takes a great deal of time up to several years for all of the bonds to form, which eventually determines the product's strength for the life of the well.

When adding the present composition, the water changes chemically in sphere, electrical load, surface tension and reaches a chemical/physical equilibrium in the matrix. This complex process depends of the type and mass of materials involved in the cement slurry. Similar to the chemical processes physical aspects are part of the equilibrium process in the matrix when the amount of water, trapped as free water is reduced and the crystals grow into the empty void space. This makes the product less permeable to water and more resistant to all types of attack that are either water dependant or water influenced. A bigger fraction of the water is converted to crystalline water than is the case with the reactions in the absence of the present inventive composition. The reduced porosity and increased crystalline structural matrix increases compressive, flexural and breaking strength of the product and change the relative ratio between these strengths.

As before the strength of the product increases when less water is used to make a product. The hydration reaction itself now tends to consume a different amount of water. When the present inventive composition is mixed with oil well cement it is also possible to use salt water and achieve a good end result.

Embodiments disclosed in the present invention for one aspect of the invention (i.e. for the catalyst composition) are, were applicable, also intended to be used for other aspects of the inventions, such as for the binder composition, the construction composition and vice versa.

The present invention is further explained in the appended claims.

The invention claimed is:

1. A catalyst composition for pozzolan compositions, consisting of:
    a) one or more chlorides, selected from the group consisting of: sodium chloride, potassium chloride, magnesium chloride, calcium chloride, strontium chloride, barium chloride and ammonium chloride; and
    b) aluminum chloride, and
    c) one or more metal oxides selected from the group consisting of: oxides from metals from Group II of the Periodic Table, and oxides from metals from Group VIII B of the Periodic Table.

2. The composition according to claim 1, wherein the total quantity of components from group a. is 1 to 25% by weight; based on the total weight a.+b.+c.

3. The composition according to claim 1, wherein the total quantity of components from group b. is 10 to 50% by weight, based on the total weight a.+b.+c.

4. The composition according to claim 1, wherein the total quantity of components from group c. is 5 to 40% by weight, based on the total weight a.+b.+c.

5. A process of preparing cement for oil well cementing comprising adding the composition according to claim 1 to the cement for oil well cementing.

6. A process for lowering the pH of cement, which comprises adding to the cement an effective pH lowering amount of the composition according to claim 1.

* * * * *